Dec. 23, 1958        V. J. KING        2,865,113
PARLIAMENTARY PROCEDURE GUIDE BOARD
Filed May 3, 1956        2 Sheets-Sheet 1

INVENTOR.
VALENTINE J. KING
BY
Bruce & Brosler
HIS ATTORNEYS

Dec. 23, 1958 V. J. KING 2,865,113
PARLIAMENTARY PROCEDURE GUIDE BOARD
Filed May 3, 1956 2 Sheets-Sheet 2

INVENTOR.
VALENTINE J. KING
BY
Bruce & Brosler
HIS ATTORNEYS

United States Patent Office 2,865,113
Patented Dec. 23, 1958

2,865,113

PARLIAMENTARY PROCEDURE GUIDE BOARD

Valentine J. King, San Francisco, Calif., assignor of twenty-five percent to Emmet King, San Francisco, fifteen percent to Paul Bergemann, Nevada City, fifteen percent to T. L. Bergemann, Berkeley, and twenty percent to William Bergemann, Berkeley, Calif.

Application May 3, 1956, Serial No. 582,431

8 Claims. (Cl. 35—21)

My invention relates to the conducting of meetings, and more particularly to a guide means for the conducting of meetings in accordance with established rules of parliamentary procedure.

The proper conducting of meetings requires adherence to well established rules of procedure, such as Roberts' Rules of Order and Cushings' Manual of Parliamentary Practice, which, to say the least, become quite involved and technical.

Accordingly, relatively few individuals have become so proficient in these procedures as to be able to handle with dispatch and without recourse to the books, the many problems which can and do confront one during the course of a meeting, and to seek the answers while a meeting is in progress, it is apt to be time consuming and otherwise detrimental to the smooth running of an organization.

Among the objects of the present invention are, (1) To provide a novel and improved means for facilitating the conducting of meetings in accordance with established rules of procedure;

(2) To provide a novel and improved guide for use by chairmen in the conducting of meetings;

(3) To provide a novel and improved mechanical device in the form of a parliamentary procedure guide board for use in determining parliamentary procedure in the conducting of meetings.

Additional objects of my invention will be brought out in the following description of a preferred embodiment of the same, taken in conjunction with the accompanying drawings wherein, Figure 1 is a plan view of a parliamentary guide board embodying the features of the present invention;

Figure 2 is a view in section taken in the plane 2—2 of Figure 1;

Figure 3:
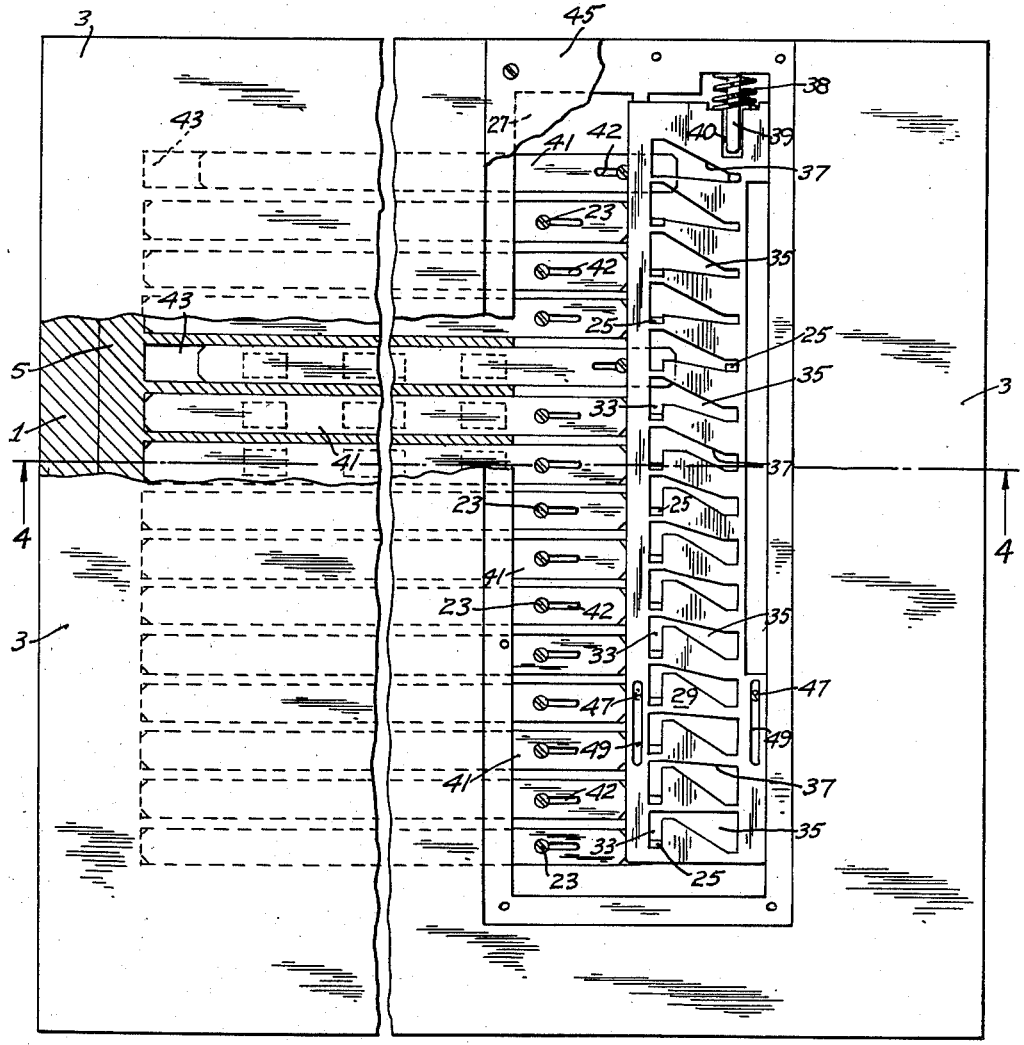
Figure 3 is a fragmentary rear view of the board of Figure 1 with portions removed to expose internal structure.
Figure 4:
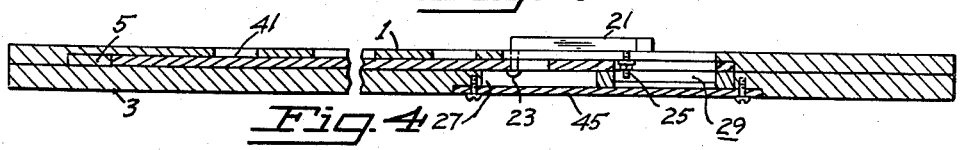
Figure 4 is a view in section taken in the plane 4—4 of Figure 3.
Figure 5:
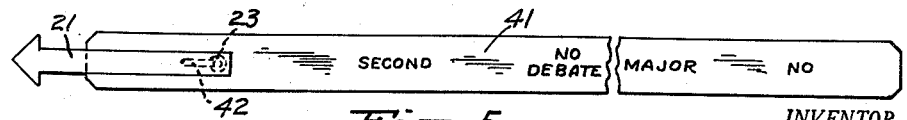
Figure 5 is a plan view of an indicator and associated information strip incorporated in the guide board of the present invention.

Referring to the drawings for details of my invention in its preferred form, the guide board may be made up of a face board 1 and a back board 3, and to facilitate fabrication of the complete device, may also include a middle or intermediate board 5 which may be considered as a component part of the face board. On the face board, adjacent one edge thereof, is arranged a list 7 of parliamentary motions in the order of their importance or precedence. In line with each motion so listed is a horizontal row of openings 9, 11, 13, 15, 17, 19 . . . etc., the first opening in each row being preferably in the form of an elongated slot, while the remaining openings are shorter and wider to constitute windows in the face board.

The slot openings are for the purpose of mounting movable indicators 21 one for each of the listed motions, such indicator being movable from a position considered the non-indicating position and determined by the right end of its associated slot, to another position which may be termed an indicating position and determined by the left end of the same slot.

Such indicators may be in the form of arrows with each pointing toward the procedure with which it is associated. These are each slidably fixed to the face board by means of a pair of pins or studs 23, 25, or equivalent extending from the indicator through its associated slot and carrying on the under side of the face board, an enlargement such as a stud head, nut, etc., to retain the indicator on the board, while permitting movement thereof between the two extreme positions determined by the length of the slot.

The back board is provided with an opening 27 behind the indicators and comparable in area to that within which operations of the indicators take place.

This opening provides for the reception of means for coupling all of the indicators in such a way that movement of one of the indicators from its non-indicating position to its indicating position, serves to lock against movement, all indicators of lower order or precedence which at the time may be in their non-indicating positions. The means for accomplishing this purpose includes a coupling strip 29 having a plurality of openings therein corresponding in number to the number of indicators, with each such opening including a locking slot 33 and a connecting cam slot 35, the locking slots being progressively shorter, as viewed upward from the bottom opening, and decreasing to zero depth at the uppermost opening. The cam slots have cammed upper edges 37 which increase in declination from a substantially horizontal or zero cam edge in the lowermost cam slot to a maximum declination in the uppermost cam slot.

To effect the coupling between this strip and the indicators, each of the indicators is provided with a pin which preferably is an extension of pin 25, and this enters its proximate opening in the coupling strip, at a point corresponding to the others when the indicator occupies its non-indicating position.

The progressive changes in the locking slots and the cam slots result in openings which progressively change in outline, and to better define such openings, it might be pointed out that each is bounded by a phantom rectangle of the same size, with the lower end of each locking slot and cam slot occupying the lower corners of such rectangle and with each cam edge terminating at that upper corner of such rectangle lying above the locking slot.

The coupling strip is normally urged in a downward direction to engage these pins when all indicators are in their non-indicating positions, by a coil spring 38 disposed under compression between the upper end of the coupling strip and the proximate edge of the opening 27 in which the coupling strip is disposed. A peg 39 extending downwardly from said proximate edge, preferably into a notch 40 in the coupling strip, retains the spring against displacement.

With each coupling pin entering a coupling strip opening above the locking notch and at the start of the cam edge, it will be apparent that any movement of an indicator from its non-indicating position to its indicating position, will cause its associated coupling pin to ride along the cam edge of its associated opening in the coupling strip and cause the coupling strip to be lifted or moved upwardly by an amount determined by the declination of the cam edge of such opening. This declination is so determined that by the time the coupling pin has reached the far end of the cam edge which is preferably terminated on a horizontal to provide a stable dwell position for the pin, all coupling pins below will have been caused to enter their respective locking slots, that is, if the indicators associated therewith occupy non-indicating positions.

If any such indicator had previously been moved to its indicating position, its coupling pin will occupy a position in its associated cam slot and will remain there. The indicator belonging to this coupling pin cannot then be withdrawn to its non-indicating position, because to do so will require a downward movement of the coupling strip and this is precluded by the coupling pin belonging to the indicator of higher order which had been moved to its indicating position.

The practical significance of all this, lies in the fact that if some order of business such as a main motion is under consideration and this is indicated by the pertinent indicator on the board, then if someone makes a motion of greater importance, such as a motion to lay on the table, and the pertinent indicator on the board is moved to its indicating position, then the latter motion must first be disposed of before the main motion can be taken under consideration.

In the meantime, because none of the other indicators of lower precedence can be moved to their indicating positions, none of these motions can be brought up at this time until the motion to lay on the table has first been disposed of. Then any order of business of greater importance than the main motion may be considered, because of the fact that those indicators are then free to be moved to their indicating positions. Anything below the main motion cannot be taken up for consideration before the main motion has first been disposed of.

To further stabilize the operation of the board, the coupling pins are preferably of rectangular cross section or provided with planar engaging surfaces.

In addition to the order of precedence of the motions previously listed, it becomes necessary also to know how each such motion must be handled in order to dispose of it. For example, some motions require a second, some may be debated while others may not be debated, some may be amended, some may be carried by a majority vote, others require a different vote total to carry them, etc.

Such information is conveyed to the user of the board by applying the information to a strip 41 which is tagged to the pertinent one of the indicators, preferably behind the face board, and preferably by means of that pin or stud 23 which slidably holds the indicator to the face board. Thus the strip will move with movement of the indicator from its non-indicating to its indicating position and vice versa, and by spacing the information in accordance with the spacing between the windows in the face board, the information may be exposed when the indicator moves to its indicating position, and hidden behind the face board when the indicator is returned to its non-indicating position.

To avoid excessive spacing between windows on the board, a lost motion connection may be resorted to in tagging the strip to its indicator, such lost motion connection being affected by providing a slot 42 in the information strip where the connecting pin 23 passes through. Such slot should be substantially shorter than the slot 9 in which the indicator moves. Thus movement of the information strip is delayed until such pin has moved the length of the slot 42.

To assure guided movement of each information strip with movement of its associated indicator, the middle or intermediate board may be cut out to provide with the face board, a plurality of longitudinal strip receiving channels 43, each of the width of a strip and running substantially the length of the board, and the information strips may be disposed therein, one to a channel. The provision of such intermediate board is the equivalent of adding a plurality of spaced ribs to the facing board, on the back side thereof, which will provide such channels for reception of the information strips.

After the board has been properly assembled to function in the manner indicated, a cover plate 45 may be applied to the back board to cover up the otherwise exposed coupling strip 29 and hold it in its coupling relationship. To preclude side movement of the coupling strip and without hindrance to its desired longitudinal movement, such cover plate may have a pair of guide pins 47 anchored thereto, in position to enter grooves 49 in the coupling strip adjacent the side edges thereof.

From the foregoing description of my invention in its preferred form, it will be apparent that the chairman of a meeting, with little or no knowledge of rules of procedure, will have little or no difficulty in disposing of the many motion embodied in the list depicted in the drawings.

A certain few orders of business 50 which a chairman may encounter however, do not fall into this category, but take precedence at any time, and when brought up, interrupt any pending motions. Such orders of business and pertinent information thereto may be listed on the face of the board for the benefit of the chairman.

Also the procedure to be followed in conducting a meeting may be of help to some chairman, and such information may be printed on a separate card 51 of small size which may be removably housed in a pocket 53 formed in one edge of the board between the face board and the back board.

While I have disclosed my invention in its preferred form, the same is subject to alteration and modification without departing from the underlying principles involved and I accordingly do not desire to be limited in my protection to the specific details illustrated and described except as may be necessitated by the appended claims.

I claim:

1. A parliamentary procedure control device comprising a board, a list of parliamentary motions arranged on said board in order of their precedence, a plurality of indicators, each associated with one of the motions on said list and indicative of the pendency of a motion when an indicator is moved from a non-indicating position to an indicating position, and means responsive to such movement for precluding similar movement of indicators associated with motions of a lower order.

2. A parliamentary procedure control device comprising a board, a list of parliamentary motions arranged on said board in order of their precedence, a plurality of movable indicators, each associated with one of the motions on said list and indicative of the pendency of a motion when an indicator is moved from a non-indicating position to an indicating position, and means intercoupling all said indicators and adapted, when an indicator is moved to an indicating position, to lock out all indicators occupying non-indicating positions and associated with motions of a lower order on said list.

3. A parliamentary procedure device comprising a board, a list of parliamentary motions arranged on said board in order of their precedence, a plurality of movable indicators, each associated with one of the motions on said list and indicative of the pendency of a motion when an indicator is moved from a non-indicating position to an indicating position, means intercoupling all said indicators and adapted, when an indicator is moved to an indicating position, to lock out all indicators occupying non-indicating positions and associated with motions of a lower order on said list, and means connecting with each of said indicators and bearing pertinent parliamentary information relative to the motion identified by its associated indicator.

4. A parliamentary procedure control device comprising a board, a list of parliamentary motions arranged on said board in order of their precedence, a plurality of movable indicators, each associated with one of the motions on said list and indicative of the pendency of a motion when an indicator is moved from a non-indicating position to an indicating position, means intercoupling all said indicators and adapted, when an indicator is moved to an indicating position, to lock out all indicators occupying non-indicating positions and associated with procedures of lower precedence on said list, means connecting with each of said indicators and bearing pertinent parliamentary information relative to the motion identified by its associated indicator, and means normally masking the information associated with any one indicator when said indicator is in its non-indicating position and exposing such information upon movement of said indicator to its indicating position.

5. A parliamentary procedure control device comprising a board comprising a back board and a face board, said face board having a list of parliamentary motions arranged thereon in order of their precedence and an opening in line with each of said listed motions, a plurality of indicators, each associated with one of said listed motions, means slidably anchoring each of said indicators in one of said openings to permit movement of each indicator from a non-indicating position to an indicating position, means inter-coupling all said indicators and responsive to movement of one from a non-indicating position to an indicating position, for locking out any indicators occupying non-indicating positions and associated with motions of a lower order on said list, said means including a coupling strip disposed substantially behind said indicators, said strip having a plurality of openings therein, one for each indicator and bounded by a phantom rectangle of same size, with each such opening involving a locking slot at a lower corner of such rectangle and a connecting cam slot extending to the other lower corner of such rectangle, said locking slots being progressively shorter as viewed from the bottom opening up and decreasing to zero at the uppermost opening, said cam slots having cammed upper edges, increasing in declination from a substantially horizontal edge in the lowermost cam slot to a substantially diagonal upper edge in the topmost cam slot.

6. A parliamentary procedure control device comprising a board comprising a back board and a face board, said face board having a list of parliamentary motions arranged vertically thereon in order of their precedence and an opening in line with each of said listed motions, a plurality of indicators, each associated with one of said listed motions, means slidably anchoring each of said indicators in one of said openings to permit substantially horizontal movement of each indicator from a non-indicating position to an indicating position, means inter-coupling all said indicators and responsive to movement of one from a non-indicating position to an indicating position, for locking out all indicators occupying non-indicating positions and associated with motions of a lower order on said list, said means including a coupling strip disposed substantially behind said indicators, said strip having a plurality of openings therein, one for each indicator and bounded by a phantom rectangle of same size, with each such opening involving a locking slot at a lower corner of such rectangle and a connecting cam slot extending to the other lower corner of such rectangle, said locking slots being progressively shorter as viewed from the bottom opening up and decreasing to zero at the uppermost opening, said cam slots having cammed upper edges, increasing in declination from a substantially horizontal edge in the lowermost cam slot to a substantially diagonal upper edge in the topmost cam slot, and means extending from each of said indicators while in its non-indicating position, through the proximate opening at a location representing that upper corner of such rectangle above the locking slot, and spring means urging said coupling strip in the direction of maintaining such relationship yet permitting movement in the reverse direction in response to shifting of an indicator from its non-indicating to its indicating position.

7. A parliamentary procedure control device comprising a board comprising a back board and a face board, said face board having a list of parliamentary motions arranged vertically thereon in order of their precedence and an opening in line with each of said listed motions, a plurality of indicators, each associated with one of said listed motions, means slidably anchoring each of said indicators in one of said openings to permit substantially horizontal movement of each indicator from a non-indicating position to an indicating position, means inter-coupling all said indicators and responsive to movement of one from a non-indicating position to an indicating position, for locking out all indicators occupying non-indicating positions and associated with motions of a lower order on said list, said means including a coupling strip disposed substantially behind said indicators, said strip having a plurality of openings therein, one for each indicator and bounded by a phantom rectangle of same size, with each such opening involving a locking slot at a lower corner of such rectangle and a connecting cam slot extending to the other lower corner of such rectangle, said locking slots being progressively shorter as viewed from the bottom opening up and decreasing to zero at the uppermost opening, said cam slots having cammed upper edges, increasing in declination from a substantially diagonal upper edge in the topmost cam slot, and a pin extending from each of said indicators while in its non-indicating position, through the proximate opening at a location representing that upper corner of such rectangle above the locking slot, spring means urging said coupling strip in the direction of maintaining such relationship yet permitting movement in the reverse direction in response to shifting of an indicator from its non-indicating to its indicating position, and means associated with each of said indicators and bearing pertinent parliamentary information relative to the motion identified by its associated indicator.

8. A parliamentary procedure control device comprising a board comprising a back board and a face board, said face board having a list of parliamentary motions arranged vertically thereon in order of their precedence and a row of openings in line with each of said listed motions, a plurality of indicators, each associated with one of said listed motions, means slidably anchoring each of said indicators in the first opening in a row of openings to permit substantially horizontal movement of each indicator from a non-indicating position to an indicating position, means inter-coupling all said indicators and responsive to movement of one from a non-indicating position to an indicating position, for locking out all indicators occupying non-indicating positions and associated with motions of a lower order on said list, said means including a coupling strip disposed substantially behind said indicators, said strip having a plurality of openings therein, one for each indicator and bounded by a phantom rectangle of same size, with each such opening involving a locking slot at a lower corner of such opening and a connecting cam slot extending to the other lower corner of such rectangle, said locking slots being progressively shorter as viewed from the bottom opening up and decreasing to zero at the uppermost opening, said cam slots having cammed upper edges, increasing in declination from a substantially horizontal edge in the lowermost cam slot to a substantially diagonal upper edge in the topmost cam slot, and a pin extending from each of said indicators while in its non-indicating position, through the proximate opening at a location representing that upper corner of such rectangle above the locking slot, spring means urging said coupling strip in the direction of maintaining such relationship yet permitting movement in the reverse direction in response to shifting of an indicator from its non-indicating to its indicating position, and means tagged to each of said indicators and bearing pertinent parliamentary information relative to the procedure identified by its associated indicator, said means including a strip behind said face board and having the information thereon exposed through the remaining openings in a row when the associated indicator is in its indicating position.

References Cited in the file of this patent

UNITED STATES PATENTS

| | | |
|---|---|---|
| 471,124 | Kelley | Mar. 22, 1892 |
| 509,891 | Gore | Dec. 5, 1893 |
| 813,360 | Dement | Feb. 20, 1906 |
| 946,868 | Robert | Jan. 10, 1910 |
| 1,000,181 | Larkin | Aug. 8, 1911 |
| 1,258,861 | Block | Mar. 12, 1918 |
| 1,709,849 | Hazel | Apr. 23, 1929 |
| 2,498,854 | Hazel | Feb. 28, 1950 |